United States Patent
Lim et al.

(10) Patent No.: US 11,205,902 B2
(45) Date of Patent: Dec. 21, 2021

(54) ENERGY STORAGE SYSTEM

(71) Applicant: LSIS CO., LTD., Anyang-si (KR)

(72) Inventors: Ui-Jai Lim, Anyang-si (KR);
Young-Geun Kim, Anyang-si (KR);
Il-Hyung Lim, Anyang-si (KR);
Do-Hyun Kim, Anyang-si (KR)

(73) Assignee: LSIS CO., LTD., Anyang-si (KR)

( * ) Notice: Subject to any disclaimer, the term of this patent is extended or adjusted under 35 U.S.C. 154(b) by 134 days.

(21) Appl. No.: 16/636,849

(22) PCT Filed: Apr. 20, 2018

(86) PCT No.: PCT/KR2018/004633
§ 371 (c)(1),
(2) Date: Feb. 5, 2020

(87) PCT Pub. No.: WO2019/031686
PCT Pub. Date: Feb. 14, 2019

(65) Prior Publication Data
US 2020/0366101 A1    Nov. 19, 2020

(30) Foreign Application Priority Data

Aug. 10, 2017 (KR) .......................... 10-2017-0101783

(51) Int. Cl.
*H02J 3/32* (2006.01)
*H02J 3/46* (2006.01)
(Continued)

(52) U.S. Cl.
CPC ................. *H02J 3/46* (2013.01); *H02J 3/32* (2013.01); *H02J 3/381* (2013.01); *H02J 9/061* (2013.01)

(58) Field of Classification Search
CPC ...... H02J 3/46; H02J 3/32; H02J 3/381; H02J 9/061
See application file for complete search history.

(56) References Cited

U.S. PATENT DOCUMENTS 6,304,006 B1 * 10/2001 Jungreis ................. H02J 9/062
307/64
6,930,402 B1 * 8/2005 Johnson ............ H01M 8/04201
290/1 R
(Continued)

FOREIGN PATENT DOCUMENTS

EP          1210758 A1     6/2002
JP          H11266532 A    9/1999
(Continued)

OTHER PUBLICATIONS

International Search Report for related International Application No. PCT/KR2018/004633; report dated Feb. 14, 2019; (3 pages).
(Continued)

*Primary Examiner* — Gary Collins
(74) *Attorney, Agent, or Firm* — K&L Gates LLP

(57) ABSTRACT

The present disclosure relates to an energy storage system for managing power of a system and a DC power distribution network linked with the system. In one embodiment, the system comprises a first converter connected between the system and the DC power distribution network so as to control voltage of the DC power distribution network; a second converter connected to the DC power distribution network; a battery which is connected to the second converter and in which a charging/discharging operation is controlled by the second converter; a third converter connected to the DC power distribution network; an emergency generator which is connected to the third converter and in which a power is controlled by the third converter; a fourth converter connected to the DC power distribution network; and a first load which is connected to the fourth converter and in which a voltage is controlled by the fourth converter.

13 Claims, 6 Drawing Sheets

(51) Int. Cl.
*H02J 3/38* (2006.01)
*H02J 9/06* (2006.01)

(56) References Cited

U.S. PATENT DOCUMENTS

| | | | | |
|---|---|---|---|---|
| 2003/0062775 A1* | 4/2003 | Sinha | H02J 9/08 | 307/68 |
| 2004/0164618 A1* | 8/2004 | Bryde | H02J 9/062 | 307/64 |
| 2006/0192435 A1* | 8/2006 | Parmley | H02J 9/062 | 307/66 |
| 2007/0138872 A1* | 6/2007 | Willets | H02J 7/345 | 307/66 |
| 2009/0278408 A1* | 11/2009 | Cioffi | H02J 9/061 | 307/80 |
| 2011/0006600 A1* | 1/2011 | Fontana | H02J 1/10 | 307/25 |
| 2011/0187197 A1* | 8/2011 | Moth | H02J 9/062 | 307/66 |
| 2012/0025616 A1* | 2/2012 | Hock | H02J 9/061 | 307/66 |
| 2012/0068541 A1* | 3/2012 | Anderson | H02J 9/061 | 307/66 |
| 2012/0267957 A1* | 10/2012 | Czarnecki | H02J 9/062 | 307/64 |
| 2016/0233689 A1 | 8/2016 | Shim | | |
| 2016/0294214 A1* | 10/2016 | Mosman | H02J 7/34 | |
| 2017/0354067 A1* | 12/2017 | Dickinson | H02J 3/14 | |

FOREIGN PATENT DOCUMENTS

| | | |
|---|---|---|
| JP | 2010068652 A | 3/2010 |
| JP | 2013169083 A | 8/2013 |
| JP | 2016021801 A | 2/2016 |
| KR | 101174891 B1 | 8/2012 |
| KR | 20130021031 A | 3/2013 |
| KR | 20140039511 A | 4/2014 |
| KR | 20160007740 A | 1/2016 |
| KR | 20160097865 A | 8/2016 |
| KR | 101727060 B1 | 4/2017 |
| KR | 20170078990 A | 7/2017 |
| WO | 2016094939 A1 | 6/2016 |

OTHER PUBLICATIONS

Written Opinion for related International Application No. PCT/KR2018/004633; report dated Feb. 14, 2019; (5 pages).
European Search Report for related European Application No. 18843707.3; action dated Apr. 21, 2020; (7 pages).
Korean Office Action for related Korean Application No. 10-2017-0101783; action dated Feb. 25, 2021; (5 pages).
European Office Action for related European Application No. 18843707.3; action dated Mar. 17, 2021; (5 pages).
Japanese Office Action for related Japanese Application No. 2020-506740; action dated Apr. 16, 2021; (5 pages).

* cited by examiner

【FIG. 1】
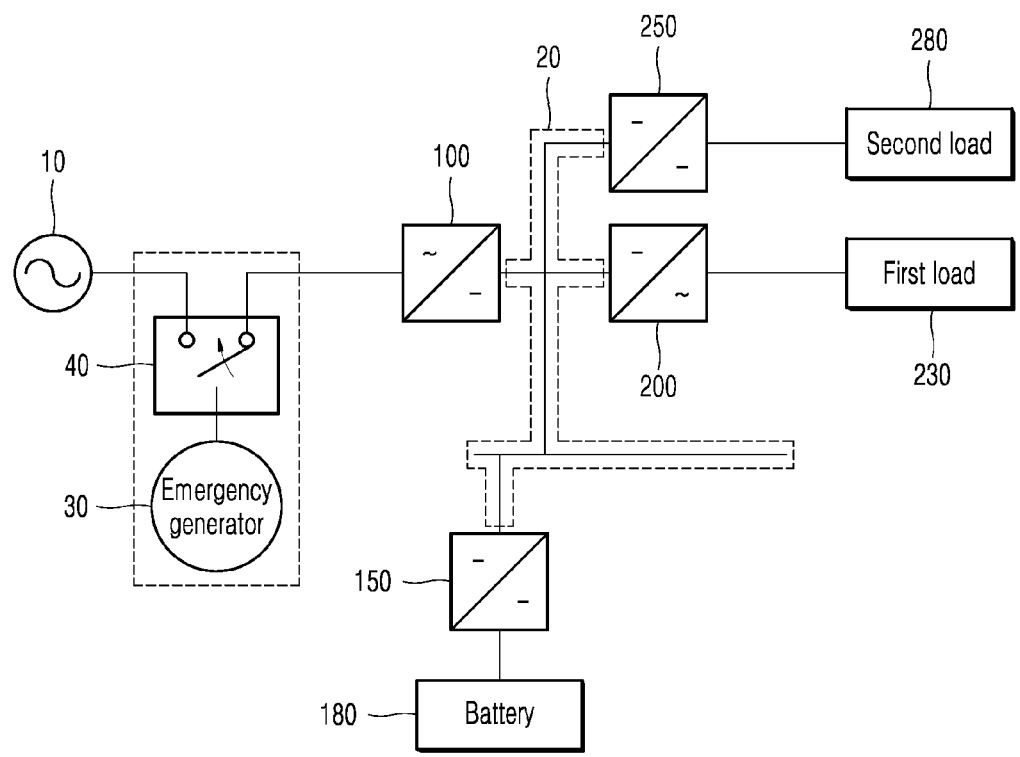

【FIG. 2】
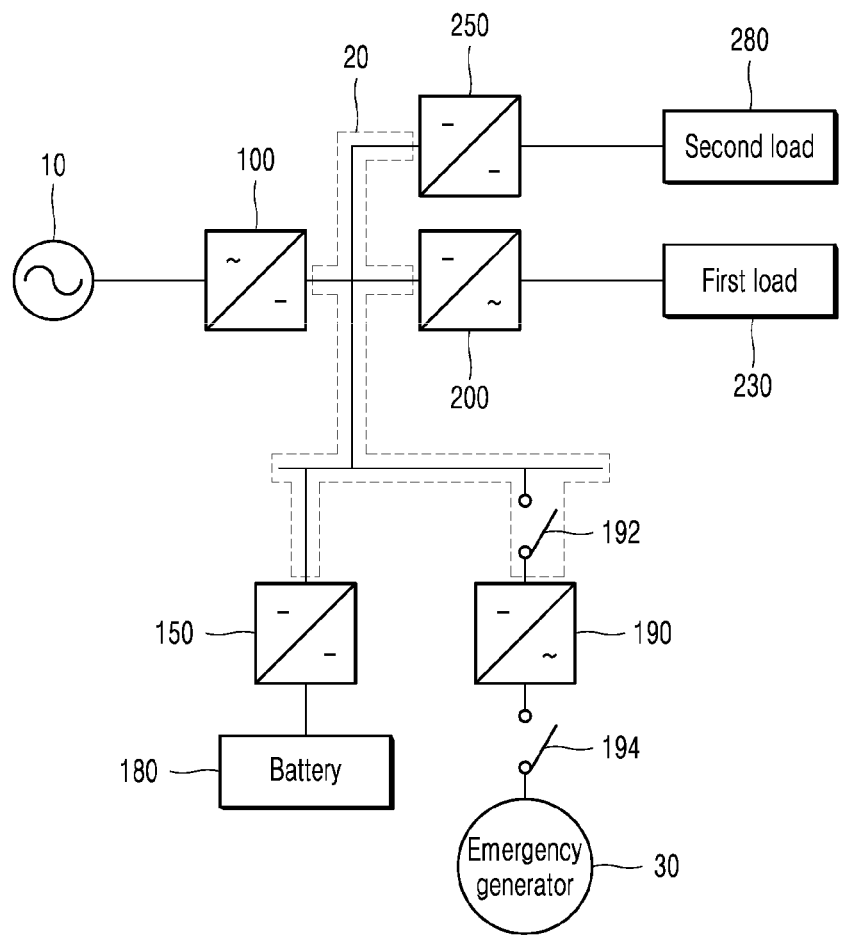

[FIG. 3]
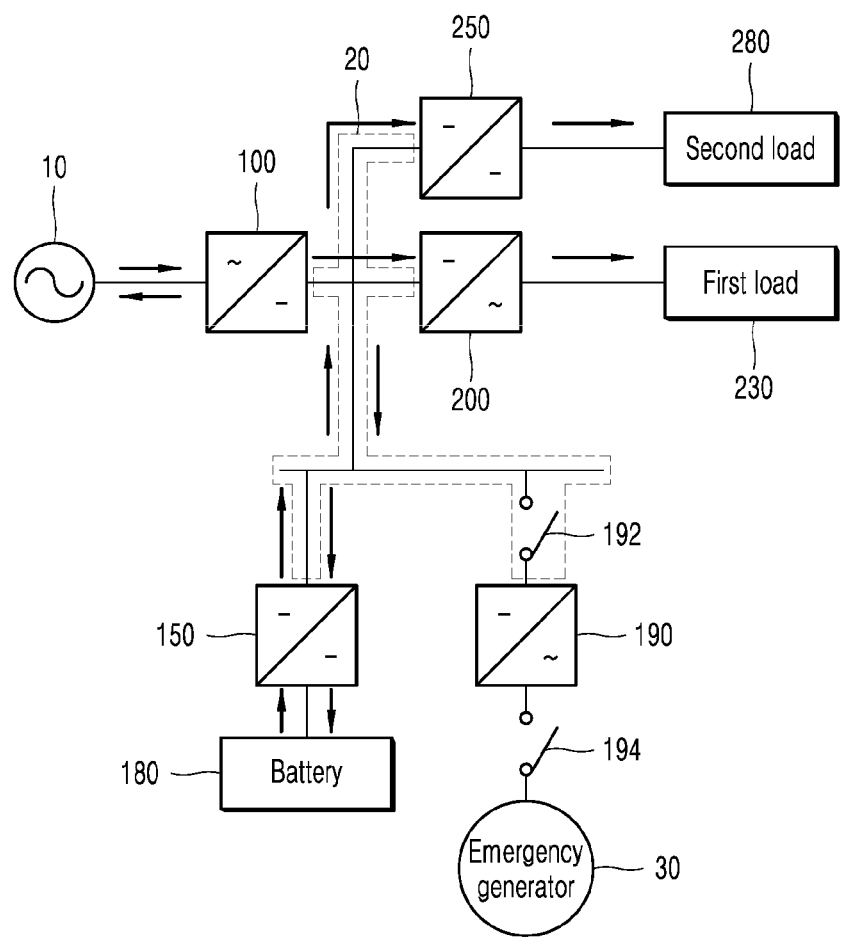

[FIG. 4]
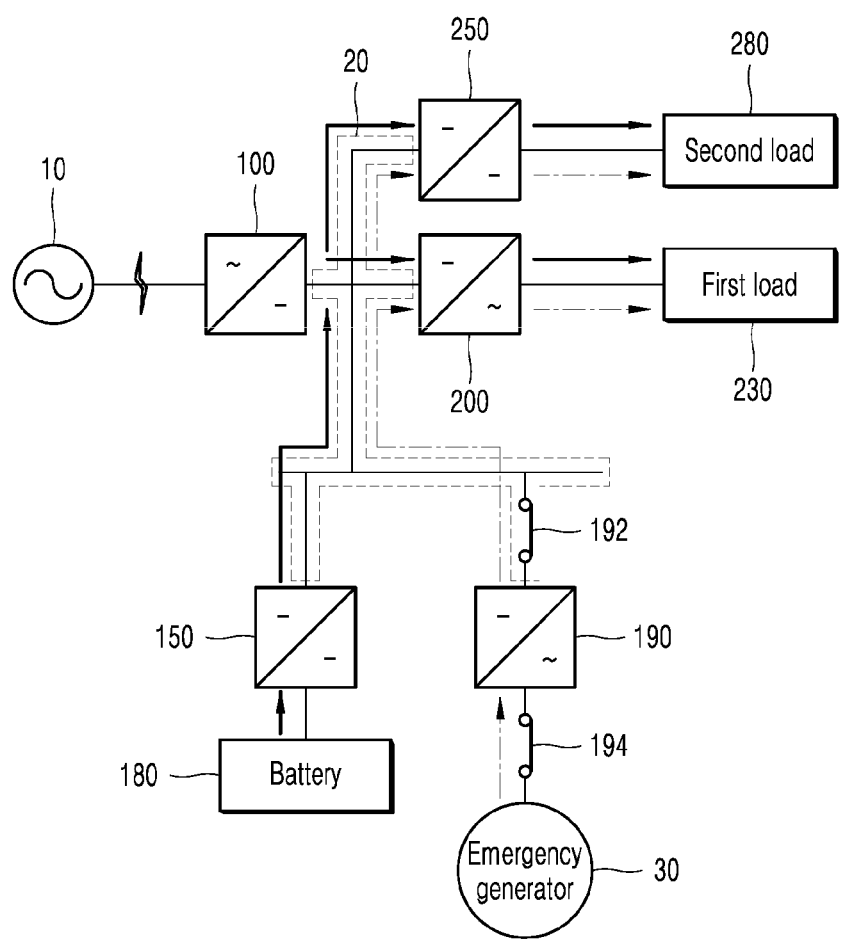

[FIG. 5]
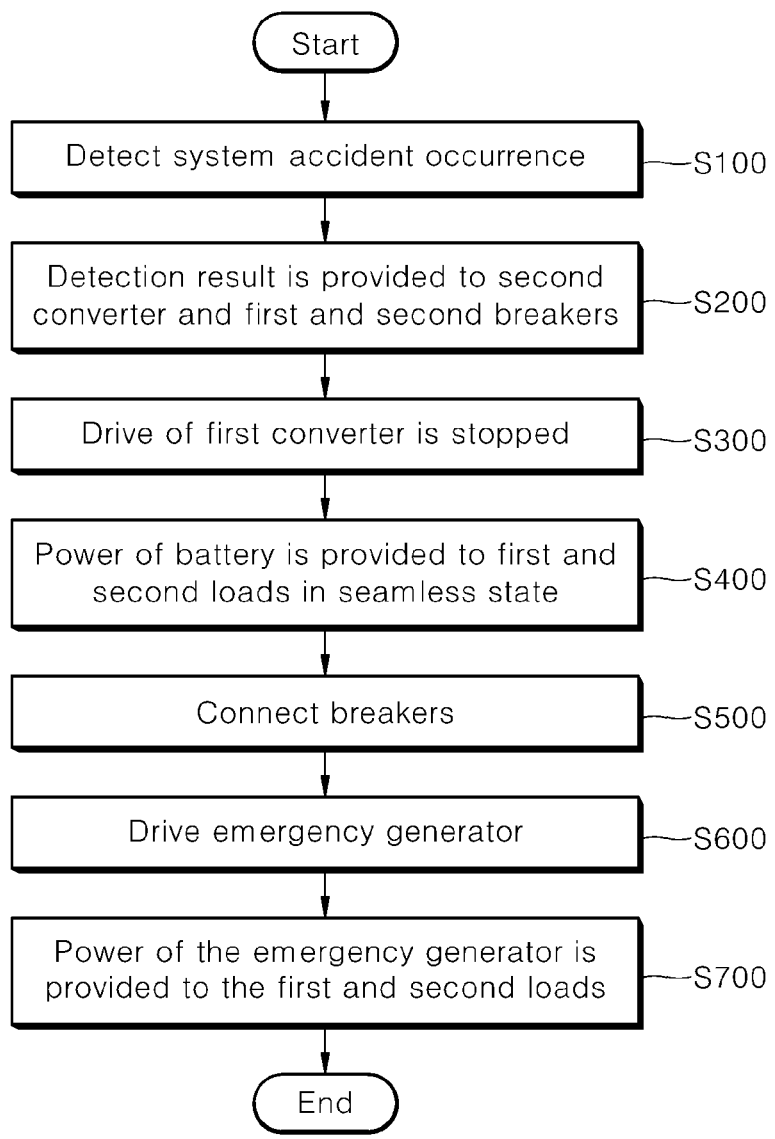

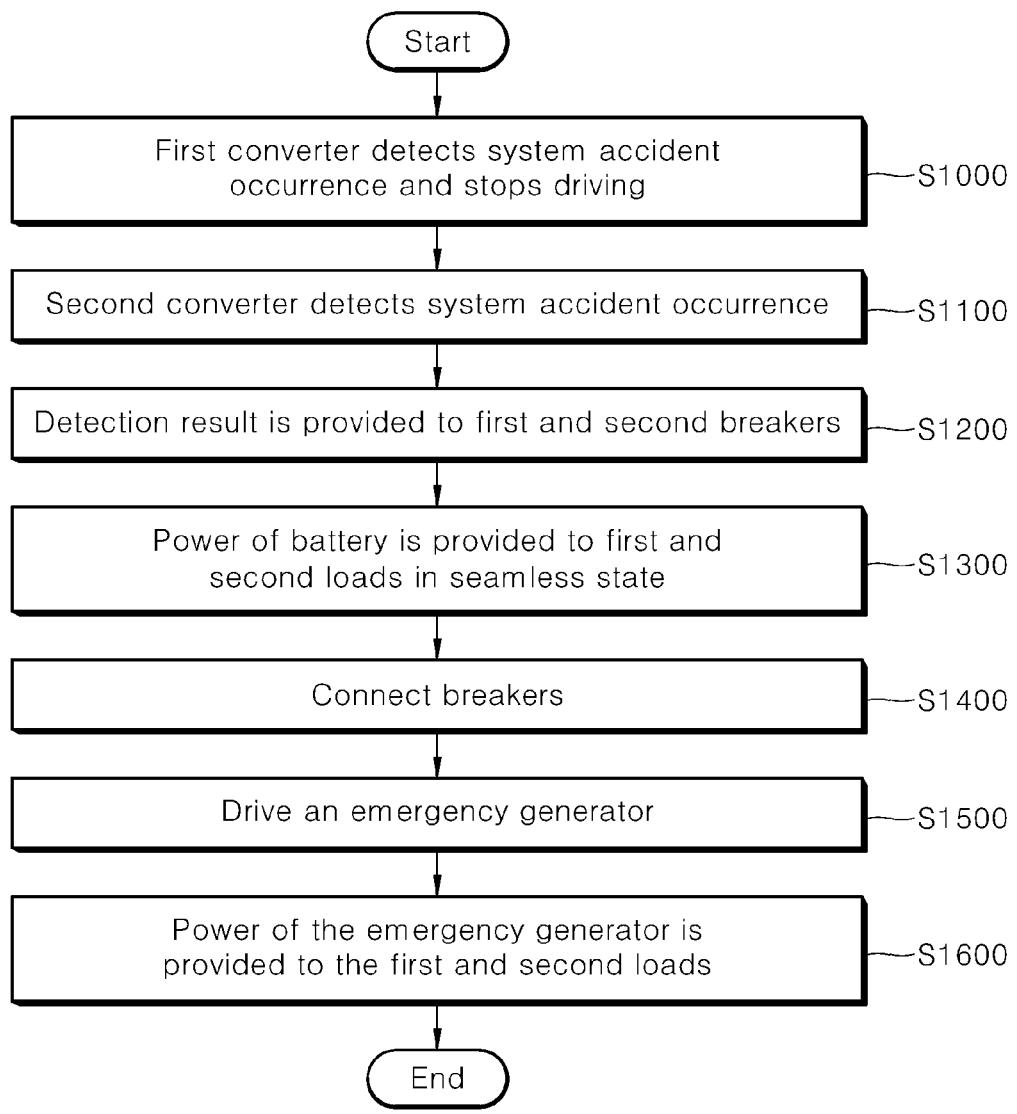

ENERGY STORAGE SYSTEM

CROSS-REFERENCE TO RELATED APPLICATIONS

The present application is a National Stage of International Application No. PCT/KR2018/004633, filed on Apr. 20, 2018, which claims the benefit of earlier filing date and right of priority to Korean Application No. 10-2017-0101783, filed on Aug. 10, 2017, the contents of which are all hereby incorporated by reference herein in their entirety.

TECHNICAL FIELD OF THE INVENTION

The present disclosure relates to an energy storage system in which seamless power supply is possible and which is able to be connected with an emergency generator without additional synchronization work.

BACKGROUND OF THE INVENTION

The energy storage system stores produced power in each of connected systems including a power plant, a substation, and a power line etc., and uses power selectively and efficiently when power is needed, thereby enhancing energy efficiency.

In the energy storage system, if an overall load rate is improved by leveling an electric load of which changes are large depending on a time zone and a season, the unit cost for generating power can be lowered, and the investment cost needed to increase power fertilities and the operating cost etc. can be reduced. Accordingly, the electric charges can be lowered and energy can be conserved.

This energy storage system is installed and utilized in a power system for generation, power transmission and/or distribution, and a consumer and is used as function of frequency regulation, a generator output stabilization by using new renewable energy, peak load shaving, load leveling, and an emergency power source etc.

Also, the energy storage system is largely divided into physical energy storage and chemical energy storage according to a storage method. The physical energy storage includes a method using pumping-up power generation, compressed air storage, and a flywheel etc., and the chemical energy storage includes a method using a lithium-ion battery, a lead storage battery, and a Nas battery etc.

Furthermore, the energy storage system has an Uninterruptible Power Supply (USP) structure and a diesel generator performing function of emergency generation, so that a seamless power supply is possible despite of power outage of the system.

Here, referring to FIG. 1, a conventional energy storage system is explained.

FIG. 1 is a schematic view depicting the conventional energy storage system.

As shown in FIG. 1, the conventional energy storage system includes an emergency generator 30 connected through a transfer switch 40 of which price is high so as to prepare for power outage of the system 10.

For reference, the transfer switch 40 may be, for example, an Automatic Transfer Switch (ATS) or a Static Transfer Switch (STS), and the emergency generator 30 may be, for example, a diesel generator.

In the conventional energy storage system, the emergency generator 30 is connected to the system 10, that is, an Alternating Current (AC) terminal, through the transfer switch 40. Accordingly, there is a problem not only the high-priced transfer switch 40 but also a device for synchronization with the system 10 or the energy storage system (that is, a UPS structure), and algorithm etc. are needed for transfer work of the emergency generator 30 upon power outage of the system 10.

Also, there is another problem if algorithm for transfer of the emergency generator 30 and power outage are extended, a battery 180 having large capacity is needed for stable operation of loads 230 and 280.

BRIEF SUMMARY OF THE INVENTION

The present disclosure is for providing an energy storage system which is able to be connected with the emergency generator without additional synchronization work upon power outage of the system.

In order to solve a problem, the energy storage system for managing power of a system and a DC (Direct Current) power distribution network linked with the system includes a first converter connected between the system and the DC power distribution network so as to control a voltage of the DC power distribution network, a second converter connected to the DC power distribution network, a battery which is connected to the second converter and in which charging and/or discharging operation is controlled by the second converter, a third converter connected to the DC power distribution network, an emergency generator which is connected to the third converter and in which power is controlled by the third converter; a fourth converter connected to the DC power distribution network, and a first load which is connected to the fourth converter and in which a voltage is controlled by the fourth converter.

The first converter is driven in a DC voltage control mode for controlling the voltage of the DC power distribution network, the second converter is driven in a power control mode for controlling power of the battery, the third converter is driven in the power control mode for controlling power of the emergency generator, and the fourth converter is driven in a Constant Voltage Constant Frequency (CVCF) mode for controlling a voltage of the first load.

When an accident occurs in the system, the first converter detects the accident of the system and provides a detection result to the second converter, so that a drive is stopped, and the second converter controls the voltage of the DC power distribution network based on the detection result provided from the first converter.

The energy storage system further includes a first breaker selectively opening or closing connection between the DC power distribution network and the third converter, and a second breaker selectively opening or closing connection between the third converter and the emergency generator.

When an accident occurs in the system, the first converter detects occurrence of the accident of the system and provides a detection result to the second converter and the first and second breakers, so that a drive is stopped, the second converter provides power of the battery to the first load in a seamless state based on the detection result provided from the first converter, the first breaker connects the DC power distribution network and the third converter based on the detection result provided from the first converter, the second breaker connects the third converter and the emergency generator based on the detection result provided from the first converter, and the third converter connected with the DC power distribution network through the first breaker drives the emergency generator connected through the second breaker.

The third converter confirms a rating state of the emergency generator when the emergency generator is driven, and is driven in a power control mode and provides power of the emergency generator to the first load when the emergency generator is driven in the rating state.

The emergency generator is driven in a CVCF mode without work of synchronization with the system or the DC power distribution and provides power to the first load.

When an accident occurs in the system, a drive of the first converter is stopped, the second converter detects occurrence of the accident of the system based on a DC voltage change rate of the DC power distribution network, provides a detection result to the first and second breakers, and provides power of the battery to the first load in a seamless state based on the detection result, the first breaker connects the DC power distribution network and the third converter based on the detection result provided from the second converter, the second breaker connects the third converter and the emergency generator based on the detection result provided from the second converter, and the third converter connected with the DC power distribution network through the first breaker drives the emergency generator connected through the second breaker.

The third converter confirms a rating state of the emergency generator when the emergency generator is driven, and is driven in a power control mode and provides power of the emergency generator to the first load when the emergency generator is driven in the rating state.

When an accident does not occur in the system, the first breaker closes connection between the DC power distribution network and the third converter, and the second breaker closes connection between the third converter and the emergency generator.

The first converter converts a AC (Alternating Current) voltage provided from the system into a DC voltage and provides the DC voltage to the DC power distribution network, or converts a DC voltage provided from the DC power distribution network into an AC voltage and provides the AC voltage to the system, the second converter converts a DC voltage provided from the DC power distribution network into a DC voltage and provides the DC voltage to the battery, or converts a DC voltage provided from the battery into a DC voltage and provides the DC voltage to the DC power distribution network, the third converter converts an AC voltage provided from the emergency generator into a DC voltage and provides the DC voltage to the DC power distribution network, and the fourth converter converts a DC voltage provided from the DC power distribution network into an AC voltage and provides the AC voltage to the first load.

The energy storage system further includes a fifth converter connected to the DC power distribution network, and a second load which is connected to the fifth converter and in which a voltage controlled by the fifth converter.

The fifth converter is driven in a CVCF mode for controlling a voltage of the second load, and converts a DC voltage provided from the DC power distribution network into a DC voltage and provides the DC voltage to the second load.

According to the present disclosure as pre-described, a seamless power supply is possible upon power outage of the system, and connection with the emergency generator without additional synchronization work is possible, so that a high-priced emergency transfer switch and synchronization algorithm with the system etc. are not needed.

In addition to the above, the present disclosure is described by explaining a specific matter for implementing an exemplary embodiment of the present disclosure.

BRIEF DESCRIPTION OF DRAWINGS

FIG. 1 is a schematic view depicting a conventional energy storage system.

FIG. 2 is a schematic view depicting an energy storage system according to an exemplary embodiment of the present disclosure.

FIG. 3 is a schematic view depicting a power supply flow by the energy storage system of FIG. 2 when a system is in a state of normal operation.

FIG. 4 is a schematic view depicting a power supply flow by the energy storage system of FIG. 2 when an accident occurs in the system.

FIG. 5 is a flowchart explaining one example of a drive method of the energy storage system of FIG. 2 when an accident occurs in the system.

FIG. 6 is a flowchart explaining another example of a drive method of the energy storage system of FIG. 2 when an accident occurs in the system.

DETAILED DESCRIPTION OF THE INVENTION

The pre-described objectives, features and advantages will be described specifically hereinafter referring to the attached drawings; therefore those skilled in the art can easily realize the technical sprit of the present disclosure. In describing the disclosure, detailed description of known technologies in relation to the disclosure is omitted if it is deemed to make the gist of the present disclosure unnecessarily vague. Hereinafter, referring to the attached drawings, a preferred embodiment according to the present disclosure will be explained specifically. Throughout the drawings, identical reference numerals denote identical or similar components.

Hereinafter, referring to FIG. 2 to FIG. 6, the energy storage system according to an exemplary embodiment of the present disclosure will be described.

FIG. 2 is a schematic view depicting the energy storage system according to an exemplary embodiment of the present disclosure. FIG. 3 is a schematic view depicting a power supply flow by the energy storage system of FIG. 2 when a system is in a state of normal operation. FIG. 4 is a schematic view depicting a power supply flow by the energy storage system of FIG. 2 when an accident occurs in the system. FIG. 5 is a flowchart explaining one example of a drive method of the energy storage system of FIG. 2 when an accident occurs in the system. FIG. 6 is a flowchart explaining another example of a drive method of the energy storage system of FIG. 2 when an accident occurs in the system.

In advance, referring to FIG. 2, the energy storage system according to an exemplary embodiment of the present disclosure can manage power of the system 10 and a DC power distribution network 20 (that is, a DC system) linked with the system 10.

Specifically, the energy storage system according to an exemplary embodiment of the present disclosure may include a first converter 100, a second converter 150, a battery 180, a third converter 190, an emergency generator 30, a fourth converter 200, a first load 230, a fifth converter 250, and a second load 280.

For reference, the energy storage system may further include not only the system 10 and the DC power distribution network 20 but also a distributed power system (not shown), may further include an additional load in addition to the first load 230 or the second load 280, or may include only any one of the first load 230 or the second load 280.

Here, the system 10 may include a power plant, a substation, and a power line etc., and the first and the second loads 230 and 280 may include, for example, home, a large building, and a factory etc. Also, the distributed power system is the system producing power by using an energy source wherein power may be produced by using one or more of a fossil fuel, a nuclear power plant, and new renewable energy (the light of the sun, wind power, and tidal power etc.).

For convenience of explanation, the case in that the energy storage system includes the first converter 100, the second converter 150, the battery 180, the third converter 190, the emergency generator 30, the fourth converter 200, the first load 230, a fifth converter 250, and a load 280 will be explained as an example.

The first converter 100 is connected between the system 10 and the DC power distribution network 20 and is able to control a voltage of the DC power distribution network 20.

Specifically, the first converter 100 converts a AC voltage provided from the system 10 into a DC voltage and provides the DC voltage to the DC power distribution network 20, or converts a DC voltage provided from the DC power distribution network 20 into an AC voltage and provides the AC voltage to the system, Accordingly, the first converter 100 may be an AC-DC converter.

Also, the first converter 100 is driven in a DC voltage control mode for controlling the voltage of the DC power distribution network 20 upon normal operation of the system 10.

For example, when an accident occurs in the system 10 (that is, in case that the system 10 is in blackout or is separated), the first converter 100 turns off a gate signal so as to stop driving.

Also, the first converter 100 may detect occurrence of an accident of the system 10 and provide a detection result to the second converter 150 and the first and second breakers 192 and 194.

The detailed content thereto will be explained hereinafter.

The second converter 150 is connected to the DC power distribution network 20 and charging and/or discharging of the battery 180 may be controlled.

Specifically, the second converter 150 converts the DC voltage provided from the DC power distribution network 20 into the DC voltage and provides the DC voltage to the battery 180, or converts the DC voltage provided from the battery 180 into the DC voltage and provides the DC voltage to the DC power distribution network 20.

Accordingly, a second converter 150 may be a DC-DC converter.

Here, the meaning of converting a DC voltage to a DC voltage may mean a DC voltage is raised or lowered to a DC voltage in a different level.

Also, the second converter 150 may be driven in a power control mode for controlling power of the battery 180 upon normal operation of the system 10.

For reference, when an accident occurs in the system 10, a drive of the first converter 100 is stopped, so that the second converter 150 is able to control a voltage of the DC power distribution network 20.

Specifically, when an accident occurs in the system 10, the second converter 150 receives a detection result of a system accident from the first converter 100 or detects a voltage change rate (that is, a DC voltage change rate according to time) of the DC power distribution network 20, so that it may be confirmed if an accident occurs in the system 10.

Also, the second converter 150 may control a voltage of the DC power distribution network 20 based on a detection result of a system accident.

That is, when an accident occurs in the system 10, the second converter 150 controls a voltage of the DC power distribution network 20, so that power of the battery 180 may be provided to at least one or more of the first and second loads 230 and 280 without delay (that is, in a seamless state).

The third converter 190 may be connected to the DC power distribution network 20 and control power of the emergency generator 30.

Specifically, the third converter 190 may convert an AC voltage provided from the emergency 30 to a DC voltage and provide the DC voltage to the DC power distribution network 20.

Accordingly, the third converter 100 may be an AC-DC converter.

Surely, if the emergency generator 30 provides a DC voltage, the third converter 190 may be a DC-DC converter. Meanwhile, for convenience of explanation, the case in that the third converter 190 is an AC-DC converter will be explained as an example in the present disclosure.

Also, the third converter 190 may be in a standby state, a drive state, or a stop state of upon normal operation of the system 10.

On the contrary, when an accident occurs in the system 10, the third converter 190 may be driven in a power control mode so as to control power of the emergency generator 30.

More specifically, when an accident occurs in the system 10, the third converter 190 confirms a rating state of the emergency generator 30, and if it is confirmed that the emergency generator 30 is driven in a rating state, the third converter 190 is driven in the power control mode and is able to provide power of the emergency generator 30 to at least one of the first and second loads 230 and 280.

Also, first and second breakers 192 and 194 are provided to both ends of the third converter 190.

Here, the first breaker 192 selectively opens and/or closes connection between the DC power distribution network 20 and the third converter 190, and the second breaker 194 selectively opens and/or closes connection between the third converter 190 and the emergency generator 30.

Specifically, when the system 10 is in normal operation, that is, in case that there is no accident in the system 10, the first breaker 192 may close connection between the DC power distribution network 20 and the third converter 190, and the second breaker 194 may close connection between the third converter 190 and the emergency generator 30.

On the contrary, in case that an accident occurs in the system 10, the first breaker 192 receives a detection result of a system accident from a first converter 100 or a second converter 150, and may connect the DC power distribution network 20 and the third converter 190 based on the received detection result. Surely, the second breaker 194 also receives a detection result of a system accident from a first converter 100 or a second converter 150, and may connect the third converter 190 and the emergency generator 30 based on the received detection result.

Also, opening and/or closing operation of the first and second breakers 192 and 194 may be performed at the same time but may be performed at a regular time interval.

For reference, the energy storage system according to an exemplary example of the present disclosure may further include an additional breaker in addition to the first and second breakers 192 and 194.

That is, the additional breaker may be further included between a converter and a load, between a converter and a DC power distribution network, and between a converter and a system etc., but for convenience of explanation, the first and second breakers 192 and 194 will be explained in the present disclosure as an example.

The fourth converter 200 may be connected to the DC power distribution network 20 and may control a voltage of the first load 230.

Specifically, the fourth converter 200 may convert a DC voltage received from the DC power distribution network 20 to an AC voltage and provide the AC voltage to the first load 230. Also, the fourth converter 200 may be driven in a CVCF so as to control a voltage of the first load 230.

Accordingly, the fourth converter 200 may be a DC-AC converter, and the first load 230 may be an AC load.

The fifth converter may be connected to the DC power distribution network 20 and control a voltage of the second load 280.

Specifically, the fifth converter 200 may convert a DC voltage received from the DC power distribution network 20 to a DC voltage and provide the DC voltage to the second load 280. Also, the fifth converter 250 may be driven in a CVCF mode so as to control a voltage of the second load 280.

Accordingly, the fifth converter 200 may be a DC-DC converter, and the second load 280 may be a DC load.

The battery 180 may be connected to a second converter 150 and charging and/and discharging thereof may be controlled by the second converter 150.

Also, the battery 180 may includes at least one or more of battery cells, and each battery cell may include a plurality of bare cells.

The emergency generator 30 may be connected to the third converter 190 and power may be controlled by the third converter 190.

Also, the emergency generator 30 may include, for example, a diesel generator. Upon power outage of the system 10, the emergency generator 30 may be driven in a CVCF mode without work of synchronization with the system 10 or the DC power distribution network 20 and provide power to at least one of the first and second loads 230 and 280.

The first load 230 may be connected to the fourth converter 200 and a voltage (that is, power) may be controlled by the fourth converter 200.

Also, the load 230 may be, for example, an AC load.

The second load 280 may be connected to the fifth converter 250, and a voltage (that is, power) may be controlled by the fifth converter 250.

Also, the second load 280 may be, for example, a DC load.

For reference, the energy storage system according to an exemplary embodiment of the present disclosure may include a communication part (not shown) and an upper controller (not shown) in spite of being not shown in drawings.

The communication part may receive information of the system 10 (for example, existence or non-existence of system accident occurrence etc.) from the first converter 100, information of a state of charge (SOC) of the battery 180 or a voltage change rate of the DC power distribution network 20 from the second converter 150, information of the emergency generator 30 (for example, whether the emergency generator 30 is driven or not, and whether the emergency generator 30 is in a rating state or not etc.) from the third converter 190, and consumed power information of the first and second loads 230 and 280 from the fourth and fifth converters 200 and 250 etc.

Also, a communication part may transmit information received from the first to fifth converters 100, 150, 190, 200, and 250 to at least one of the upper controller (not shown), the first to fifth converters 100, 150, 190, 200, and 250, and the first and second breakers 192 and 194 depending on a situation.

This communication part may be realized by high-seed communication basis (for example, a Controller Area Network (CAN)) and communicate with the first to fifth converters 100, 150, 190, 200, and 250, the upper controller, and the first and second breakers 192 and 194 in a wire or wireless way.

Surely, the energy storage system according to an exemplary embodiment of the present disclosure may not include the communication part. That is, without the additional communication part, the first to fifth converters 100, 150, 190, 200, and 250, the first and second breakers 192 and 194, and the upper controller may communicate with one another directly.

Also, the upper controller may be, for example, a Programmable Logic Controller (PLC) or an Energy Management System (EMS), control all of sequence operation of the energy storage system and give an instruction to each of components depending on each of situations in order to perform operation.

Next, referring to FIG. 3, a power supply flow by the energy storage system according to an exemplary embodiment of the present disclosure when the system 10 is in normal operation is as follows.

Specifically, in the energy storage system according to an exemplary embodiment of the present disclosure, when the system 10 is in normal operation, the second converter 150 may perform charging and/or discharging of the battery 180 based on SOC of the battery 180, and power supply and/or demand situation of the system 10.

That is, the second converter 150 may perform peak reduction function in that, for example, the battery 180 is discharged at maximum load time (when power consumption amount of the load is maximum, and the battery 180 is charged at minimum load time (when power consumption amount of the load is minimum).

Power discharged in the battery 180 may be provided to the system 10 or the first and second loads 230 and 280.

Also, the first converter 100 may control a voltage of the DC power distribution network 20 that is changed depending on power consumption amount of the first and second loads 230 and 280 and provide power of the system 10 to the first and second loads 230 and 280 through the DC power distribution network 20 concurrently.

Surely, power of the system 10 may be provided to the battery 180.

Also, the fourth converter 200 may receive power from the system 10 or the battery 180 based on a power consumption amount of the first load 230, and may control a voltage of the first load 230 in a CVCF mode.

Also, the fifth converter 250 may receive power from the system 10 or the battery 180 based on a power consumption amount of the second load 280 and may control a voltage of the second load 280 in a CVCF mode.

Next, referring to FIGS. 4 and 5, when an accident occurs in the system 10, an example of a power supply flow by the energy storage system according to an exemplary embodiment of the present disclosure is as follows.

In advance, when an accident occurs in the system 10, a first converter 100 detects the accident of the system 10 (S100).

Specifically, the first converter 100 may detect a voltage or power change of the system 10 (for example, a voltage change rate of the system 10 according to time etc.) and detect the accident of the system 10.

If the accident of the system 10 is detected (S100), the first converter 100 would provide a detection result to the second converter 150 and the first and second breakers 192 and 194 (S200).

Specifically, the first converter 100 may provide the detection result to the second converter 150 and first and second breakers 192 and 194. Surely, the first converter 100 may provide the detection result to the third to fifth converters 190, 200, and 250 and the upper controller (not shown).

If the detection result is provided to the second converter 150 and the first and second breakers 192 and 194 (S200), a drive of the first converter 100 is stopped (S300).

Specifically, the first converter 100 may turn off a gate signal so as to stop driving.

Also, the second converter 150 supplies power of the battery 180 to the first and second loads 230 and 280 in a seamless state (S400).

Specifically, the second converter 150 may provide power of the battery 180 to at least one of the first and second loads 230 and 280 in a seamless state based on a detection result received from the first converter 100.

That is, even though the system 10 and the DC power distribution network 20 are disconnected (that is, separated) with each other due to the accident of the system 10, the second converter 150 controls a voltage of the DC power distribution network 20, so that power of the battery 180 is able to be supplied to at least one of the first and second loads 230 and 280 without delay (that is, in a seamless state).

If the power of the battery 180 is supplied to the first and second loads 230 and 280 in a seamless state, connect the breakers 192 and 194 (S500).

Specifically, the first breaker 192 may connect the DC power distribution network 20 and the third converter 190 based on the detection result provided from the first converter 100, and the second breaker 194 may connect the third converter and the emergency generator 30 based on the detection result provided from the first converter 100.

Here, the first breaker 192 and the second 194 may be driven at the same time but may be driven at a time interval.

For reference, S300, S400, and S500 may be performed concurrently, and be performed out of sequence at a time interval.

If the first and second breakers 192 and 194 are connected (S500), drive the emergency generator 30 (S600).

Specifically, the third converter 190 connected with the DC power distribution network 20 through the first breaker 192 may drive the emergency generator 30 connected through the second breaker 194.

Here, the third converter 190 may confirm a rating state of the emergency generator 30 in advance in case that the emergency generator 30 is driven.

If the emergency generator 30 is driven (S600), power of the emergency generator 30 would be provided to first and second loads 230 and 280 (S700).

Specifically, if it is determined the emergency generator 30 is driven in a rating state, the third converter 190 may be driven in a power control mode and may supply power of the emergency generator 30 to at least one of the first and second loads 230 and 280.

Through the pre-described process, power of the battery 180 may be provided to the first and second loads 230 and 280 in a seamless state during the initial predetermined time (for example, about 10 minutes at the initial time) after power outage of the system 10. Thereafter, if the emergency generator 30 is driven, power of the emergency generator 30 may be provided to the first and second loads 230 and 280 without additional synchronization work.

For reference, the battery is discharged until SOC is in a minimum state, so that power may be provided to the first and second loads 230 and 280.

Meanwhile, referring to FIGS. 4 and 6, when an accident occurs in the system 10, another example of a power supply flow by the energy storage system according to an exemplary embodiment of the present disclosure is as follows.

In advance, when an accident occurs in the system 10, the first converter 100 detects an accident of the system 10 and stops driving (S1000).

Specifically, the first converter 100 may detect a voltage or power change (for example, a voltage change rate of the system 10 according to time etc.) and may detect an accident of the system 10. If an accident of the system is detected, a gate signal may be turned off so as to stop driving.

The second converter 150 detects accident occurrence of the system 10 (S1100).

Specifically, the second converter 150 may detects accident occurrence of the system 10 based on a DC voltage change rate of the DC power distribution network 20.

Here, the second converter 150 may detect a DC voltage change rate of the DC power distribution network 20 according to time at all times and may be aware that an accident occurs in the system 10 if the DC voltage change rate according to time is the predetermined reference value or more.

For reference, detection work of a system accident in S1000 and S1100 may be performed at the same time or may be performed at a time interval.

If accident occurrence of the system 10 is detected by the second converter 150 (S200), a detection result would be provided to the first and second breakers 192 and 194 (S1200).

Specifically, the second converter 150 may provide the detection result to the first and second breakers 192 and 194. Surely, the second converter 150 may provide the detection result to the third to fifth converters 190, 200, and 250 and the upper controller (not shown).

If the detection result is provided to the first and second breakers 192 and 194 (S1200), the second converter 150 would provide power of the battery 180 to the first and second loads 230 and 280 in a seamless state (S1300).

Specifically, the second converter 150 may provide power of the battery 180 to at least one of the first and second loads 230 and 280 in a seamless state based on the detection result.

That is, even though the system 10 and the DC power distribution network 20 are disconnected (that is, separated) with each other due to the accident of the system 10, the second converter 150 controls a voltage of the DC power distribution network 20, so that power of the battery 180 is able to be supplied to at least one of the first and second loads 230 and 280 without delay (that is, in a seamless state).

If power of the battery 180 is supplied to the first and second loads 230 and 280 in a seamless state, connect the breakers 192 and 194 (S1400).

Specifically, the first breaker 192 may connect the DC power distribution network 20 and the third converter 190 based on the detection result provided from the second converter 150, and the second breaker 194 may connect the third converter and the emergency generator 30 based on the detection result provided from the second converter 150.

Here, the first and second breakers 192 and 194 may be driven at the same time but may be driven at a time interval.

For reference, a drive stop of the first converter 100 in S1000, S1300, and S1400 may be performed concurrently, and be performed out of sequence at a time interval.

If the first and second breakers 192 and 194 are connected (S1400), drive the emergency generator 30 (S1500).

Specifically, the third converter 190 connected with the DC power distribution network 20 through the first breaker 192 may drive the emergency generator 30 connected through the second breaker 194.

Here, the third converter 190 may confirm a rating state of the emergency generator 30 in advance in case that the emergency generator 30 is driven.

If the emergency generator 30 is driven (S1500), provide power of the emergency generator 30 to the first and second loads 230 and 280 (S1600).

Specifically, if it is determined the emergency generator 30 is driven in a rating state, the third converter 190 would be driven in a power control mode, so that power of the emergency generator 30 is provided to at least one of the first and second loads 230 and 280.

In the pre-described process, power of the battery 180 may be provided to the first and second loads 230 and 280 in a seamless state during the initial predetermined time (for example, about 10 minutes at the initial time) after power outage of the system 10. Thereafter, if the emergency generator 30 is driven, power of the emergency generator 30 may be provided to the first and second loads 230 and 280 without additional synchronization work.

According to the present disclosure as pre-described, a seamless power supply is possible upon power outage of the system, and connection with the emergency generator 30 through the third converter 190 without additional synchronization work is possible, so that a high-priced emergency transfer switch and synchronization algorithm with the system etc. are not needed. Furthermore, there is no need to include a battery having large capacity, so that cost reduction is possible.

Various substitutions, modifications, and changes may be made by one having ordinary skill in the art within the scope of the technical spirit of the disclosure. Therefore the present disclosure as pre-described is not limited to the embodiments and the drawings set forth herein.

The invention claimed is:

1. An energy storage system for managing power of a system and a Direct Current (DC) power distribution network linked with the system, the energy storage system comprising:
    a first converter connected between the system and the DC power distribution network so as to control a voltage of the DC power distribution network;
    a second converter connected to the DC power distribution network;
    a battery which is connected to the second converter and in which charging and/or discharging operation is controlled by the second converter;
    a third converter connected to the DC power distribution network;
    an emergency generator which is connected to the third converter and in which power is controlled by the third converter;
    a fourth converter connected to the DC power distribution network; and
    a first load which is connected to the fourth converter and in which a voltage is controlled by the fourth converter,
    wherein when an accident occurs in the system, the emergency generator is driven in a Constant Voltage Constant Frequency (CVCF) mode without work of synchronization with the DC power distribution network.

2. The energy storage system of claim 1, wherein the first converter is driven in a DC voltage control mode for controlling the voltage of the DC power distribution network, wherein the second converter is driven in a power control mode for controlling power of the battery, wherein the third converter is driven in the power control mode for controlling power of the emergency generator, and wherein the fourth converter is driven in the CVCF mode for controlling the voltage of the first load.

3. The energy storage system of claim 2, wherein when the accident occurs in the system: the first converter detects occurrence of the accident of the system and provides a detection result to the second converter so that a drive is stopped, and the second converter controls the voltage of the DC power distribution network based on the detection result provided from the first converter.

4. The energy storage system of claim 1, further comprising:
    a first breaker selectively opening and/or closing connection between the DC power distribution network and the third converter; and
    a second breaker selectively opening and/or closing connection between the third converter and the emergency generator.

5. The energy storage system of claim 4, wherein when the accident occurs in the system: the first converter detects occurrence of the accident of the system and provides a detection result to the second converter and to the first and second breakers so that a drive is stopped, the second converter provides power of the battery to the first load in a seamless state based on the detection result provided from the first converter, the first breaker connects the DC power distribution network and the third converter based on the detection result provided from the first converter, the second breaker connects the third converter and the emergency generator based on the detection result provided from the first converter, and the third converter connected with the DC power distribution network through the first breaker drives the emergency generator connected through the second breaker.

6. The energy storage system of claim 5, wherein the third converter: confirms a rating state of the emergency generator when the emergency generator is driven, and is driven in a power control mode and provides power of the emergency generator to the first load when the emergency generator is driven in the rating state.

7. The energy storage system of claim 4, wherein when the accident occurs in the system: a drive of the first converter is stopped, the second converter detects occurrence of the accident of the system based on a DC voltage change rate of the DC power distribution network, the second converter provides a detection result to the first and second breakers, the second converter provides power of the battery to the first load in a seamless state based on the detection result, the first breaker connects the DC power distribution network and the third converter based on the detection result provided from the second converter, the second breaker connects the third converter and the emergency generator based on the detection result provided from the second converter, and the third converter connected with the DC power distribution network through the first breaker drives the emergency generator connected through the second breaker.

8. The energy storage system of claim 7, wherein the third converter: confirms a rating state of the emergency generator when the emergency generator is driven, and is driven in a power control mode and provides power of the emergency generator to the first load when the emergency generator is driven in the rating state.

9. The energy storage system of claim 4, wherein when the accident does not occur in the system: the first breaker closes connection between the DC power distribution network and the third converter, and the second breaker closes connection between the third converter and the emergency generator.

10. The energy storage system of claim 1, wherein the emergency generator is driven in the CVCF mode without work of synchronization with the system and provides power to the first load.

11. The energy storage system of claim 1, wherein the first converter converts an Alternating Current (AC) voltage provided from the system into a DC voltage and provides the DC voltage to the DC power distribution network, or converts a DC voltage provided from the DC power distribution network into an AC voltage and provides the AC voltage to the system,
  wherein the second converter converts a DC voltage provided from the DC power distribution network into a DC voltage and provides the DC voltage to the battery, or converts a DC voltage provided from the battery into a DC voltage and provides the DC voltage to the DC power distribution network,
  wherein the third converter converts an AC voltage provided from the emergency generator into a DC voltage and provides the DC voltage to the DC power distribution network, and
  wherein the fourth converter converts a DC voltage provided from the DC power distribution network into an AC voltage and provides the AC voltage to the first load.

12. The energy storage system of claim 11, further comprising:
  a fifth converter connected to the DC power distribution network; and
  a second load which is connected to the fifth converter and in which a voltage controlled by the fifth converter.

13. The energy storage system of claim 12, wherein the fifth converter: is driven in the CVCF mode for controlling a voltage of the second load, and converts a DC voltage provided from the DC power distribution network into a DC voltage and provides the DC voltage to the second load.

* * * * *